Jan. 17, 1961  R. L. HAYMAN ET AL  2,968,282
HYDRAULIC CONTROL SYSTEM WITH SAFETY MEANS
Filed April 8, 1958

RICHARD L. HAYMAN
DON W. DRISKEL
DAVID C. HILL
INVENTORS

BY *Lyon & Lyon*

ATTORNEYS

United States Patent Office 2,968,282
Patented Jan. 17, 1961

2,968,282

HYDRAULIC CONTROL SYSTEM WITH SAFETY MEANS

Richard L. Hayman, Don W. Driskel, and David C. Hill, Pasadena, Calif., assignors to Haskel Engineering Associates, Glendale, Calif., a copartnership Filed Apr. 8, 1958, Ser. No. 727,762

4 Claims. (Cl. 121—38)

The present invention relates to improved hydraulic control systems which are particularly suitable for use in steering the nose wheel of an aircraft but uses of the same are not necessarily limited to such particular application.

The present invention constitutes an improvement in the type of system described and claimed in U.S. Patent No. 2,622,827 of Richard L. Hayman, Don W. Driskel and David C. Hill and reference is made to the disclosure in such patent for a more complete description of the environment in which the present invention has a use.

Briefly as described herein and in Patent No. 2,622,827, a four way valve is used to control the flow of fluid under pressure to opposite sides of a work piston which is coupled to the nose wheel of an aircraft for changing its orientation, i.e., for steering purposes. A followup system which is actuated in accordance with the position of the nose wheel serves to automatically reposition the four way valve to its neutral position from which it is originally moved, using servo-mechanism techniques.

It has been found that difficulties are encountered should the four way valve fail to return to its neutral position as, for example, when the servo-mechanism does not perform its intended function or when the four way valve may become stuck. In accordance with the present invention means are incorporated in the hydraulic system to assure castering of the nose wheel should the four way valve movable element become stuck or operate improperly, for some reason or other. Briefly, this means for assuring castering comprises an orifice in the nature of a by-pass orifice through the anti-cavitation check valves described in the above mentioned patent.

It is therefore an object of the present invention to provide an improved control system for producing the above indicated results.

A specific object of the present invention is to provide a control system in which the work piston is free to adjust itself for movement in opposite directions in accordance with external conditions should the four way valve element become stuck or operate improperly.

Another specific object of the present invention is to provide an improved hydraulic control system which allows castering of the nose wheel should the four way control valve element become stuck, i.e., fail to return to its neutral position.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 3:
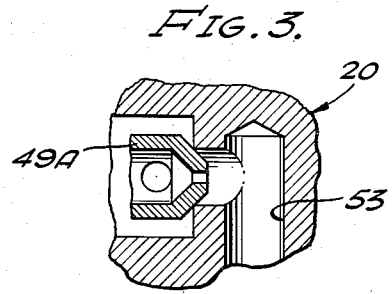

Figure 3 serves to illustrate details of the check valves 48, 49.

As shown in the aforementioned patent it is understood that the nose wheel 10 is maintained in conventional manner on aircraft so as to have desired amounts of caster to facilitate steering and self-steering. The novel mechanism 20 embodying features of the present invention is mounted as a unit in close proximity to the nose wheel for orienting its direction, i.e. steering. For this purpose the work piston 43 is mechanically coupled to the nose wheel 10 by a mechanical linkage indicated by the dotted line 10A. Details of the mechanical linkage 10A are described in the aforementioned patent. For convenience of comparsion, corresponding elements in Figure 1 herein and in Figure 14 of the aforementioned patent have identical reference numerals.

Figure 1:
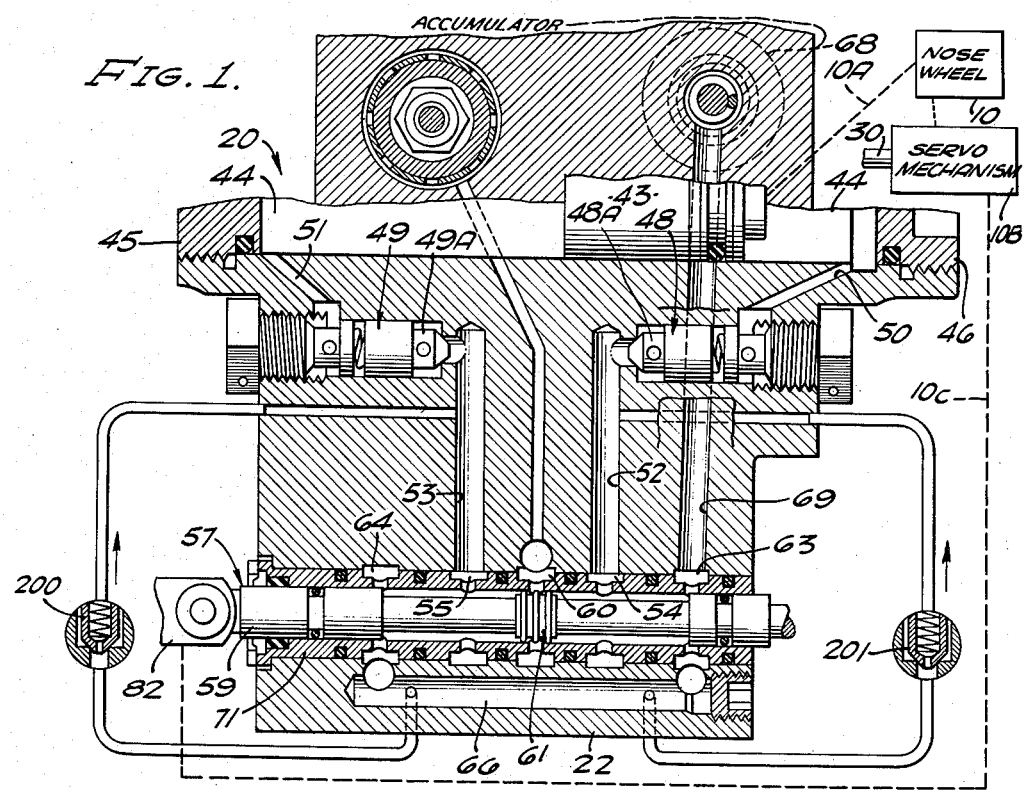
Figure 1 illustrates a control system embodying features of the present invention, it being noted that this figure corresponds substantially with Figure 14 of the aforementioned patent and while certain structural details are shown, other details of the system are illustrated in more or less schematic form so that the complete system may be illustrated in a single figure.
Figure 2:
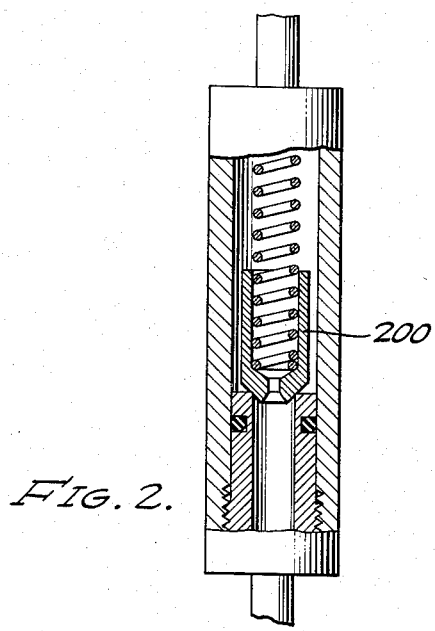
Figure 2 represents in enlarged form details of the anti-cavitation check valve having a restricted opening therethrough for achieving important objects of the present invention.

The four way valve element 59 is initially moved from its neutral position shown in Figure 1 by a flexible control cable illustrated at 30, such that rotation of the control element 30 serves to move the four way valve element 59 through a servo-mechanism 10B and mechanical linkage represented by the dotted line 10C and the element 82. The servo-mechanism 10B which senses both the angular position of the control cable 30 and the position of the nose wheel 10 serves to return the valve element 59 to its neutral position and indeed, the valve element 59 is in its neutral position when the angular position of the control element 30 "matches" the position of the nose wheel 10. The control element 30 may be controlled, for example, mechanically by the pilot or in accordance with the rudder or any other air control surface of the aircraft. Further, it will be understood that the valve control element 59 is normally biased in its neutral position shown by spring means (not shown) acting on the right hand end of the valve element 59 as shown in the aforementioned patent. Opposite sides of the work piston 43 are in communication, as shown, with check valves 48, 49 respectively, through corresponding channels 50, 51. These check valves 48, 49 control the return of flow of liquid from and to the channels 52, 53. These channels 52, 53 lead to corresponding valve ports 54, 55 of the four way valve structure.

The four way valve 57 incorporates the movable valve body 59 which has a rather limited movement to such an extent that in all positions of the valve body 59 the valve ports 54, 55 remain open. The valve body 59 in its normal position shown closes off the central high pressure port 60, using the centrally located portion 61 of increased diameter of body 59 for that purpose, while the two extreme valve ports 63, 64 are only partially closed in the normal setting of valve body 59 as shown. It is noted that such portion 61 of increased diameter is grooved circumferentially. It is noted further that in moving the valve body 59 from its centered position shown, the ports 64 or 63, as the case may be, is initially closed before the center high pressure port 60 is opened. Thus in the position of the valve member shown in Figure 1, fluid may flow from one side of the piston 43 to the other side, but only at a controlled rate determined largely by the size of the apertures in the spring pressed movable valve members 48A and 49A (Figure 3) of the check valve members 48, 49, it being noted that the check valves 48, 49 do not, in any position thereof, block completely the flow of fluid therethrough.

Thus with the valve element 59 in the central position shown, the arrangement thus far described prevents shimmying of the nose wheel 10 by damping its movement. In other words, when and if the nose wheel 10 tends to oscillate, i.e., shimmy, the motion of the nose wheel 10 is transferred to the piston 43 since it is coupled directly thereto as indicated by the mechanical connection represented at 10A. The motion of the piston 43, however, is damped because of restricted central aperture in the movable elements 48A, 49A (Figure 3) of the corresponding check valves 48, 49. More explicitly, assuming that in Figure 1 the piston 43 tends to move to the right. In such case, fluid flows from the piston chamber 44 through the channel 50, through the restricted opening in valve 48, through the channel 52, through port 54, through the body of valve 57, to the port 63 which is interconnected by channels 66 with the other valve port 64. Fluid then flows from port 63, through channel 66, through port 64, to the adjacent valve port 55, through the restricted movable valve element of check valve 49, through the channel 51 and into chamber 44 on the opposite side of piston 43. It is also noted that fluid may also flow through the restricted opening in check valve 201 which has its opposite sides in communication respectively with the channels 52 and 66; and also through the restricted opening in the check valve 200 which forms a by-pass between channels 66 and 53.

Such fluid on opposite sides of piston 43 is preferably a liquid such as oil, and in order that such oil may continually be under pressure even though the valve element 59 is at its central position, wherein at high pressure inlet port 60 is blocked, pressure is supplied from the accumulator or reservoir 68 through the channel 69 extending from such accumulator 68 to the port 63 which remains always in communication with the channel 66 and the other extreme port 64. It is noted that each time the steering mechanism is operated, the accumulator 68 is recharged.

As indicated previously, the valve body 59 is moved either when the cable 30 is rotated or, on the other hand, when the nose wheel 10 encounters some resistance in movement to optimum position.

It will be understood that means may be incorporated in the present system, as described in the aforementioned patent, such that rotation of the cable 30 has no direct effect on the control 20 unless the hydraulic pressure is applied simultaneously to the servo-mechanism 10B for operating a clutch (not shown) therein.

Assuming that the motion of the valve member 59 is such as to place the pressure port 60 in communication with the port 55, it is noted that in such case, the valve port 64 is completely closed and the other extreme valve port is completely opened.

Under these conditions, oil under pressure is delivered from the high pressure port 60 to the piston 43 to cause it and the attached nose wheel to move to a different steering position. More specifically, the oil flow for accomplishing this result is in the following path: From the high pressure port 60 through the port 55, through the channel 53, to the check valve 49 which opens under the influence of the elevated pressure in the channel 53 to thereby offer a decreased resistance of oil flow through the check valve 49, the outlet of which is in communication with the channel 51, which is in turn in communication with one side of the piston 43.

When the piston 43 thus moves, oil is expelled from the chamber on the opposite side of the piston and such oil flows in the following path: From the chamber 44 through the channel 50, through the restricted orifices of the check valve member 48 through the channel 52, through the valve port 54, through the opened port 63, through the channel 69 into the actuator 68 which has an expansible chamber and the actuator or accumulator 68 is recharged. After the accumulator 68 has been recharged, excess fluid is allowed to flow to an oil return line; and for details as to the construction of such accumulator reference is made to the aforementioned patent.

It is understood that each time the nose wheel is steered in coordination with the rudder controls, such accumulator 68 is charged with fluid.

In accordance with important aspects of the present invention, special forms of check valves 200 and 201 are interposed in channels on the one hand extending from the channel 66 to 53, and on the other hand in similar manner to the same channel 66 and the channel 52.

Contrary to the disclosure in the aforementioned patent, these check valves 200 and 201 have a restricted opening therethrough for achieving new results described below. In both cases these check valves 200 and 201 allow substantially free flow of fluid from channel 66 to 53, and also substantially free flow of fluid from channel 66 to 52, but these check valves are effective to restrict reverse flow of fluid respectively from channel 53 or 52 to channel 66.

One purpose of these two check valves 200, 201 is to prevent cavitation in the "dead end" or low pressure side of the damper piston 43 when the valve member 59 is in a position corresponding to reduced valve opening. For the above mentioned purpose the check valves 200, 201 thus serve essentially as by-pass valves and they are desirable in installations wherein it is desired to minimize the required movement of valve member 59 to produce a control action, i.e., to reduce "lost motion" in the control.

In this respect, it is noted that the ports 64, 63, as the case may be, are first closed before fluid may flow from the high pressure port 60. At the same time it is noted that in the absence of the by-pass check valves 200, 201, these ports 63, 64 normally should be opened a relatively large amount for the prevention of cavitation on the "dead end" or low pressure side of the piston 43 when the apparatus functions to prevent shimmy. Such large amount of opening of ports 63, 64 in the normal position of valve member 59 thus results in the requirement for an increased movement of the valve member 59 to effect first closing of valve 63 or 64, as the case may be which results in some lost motion. By the provision of these by-pass valves 200, 201, the normal opening of ports 63, 64 may be reduced considerably to effect reduction of "lost motion" in the control.

The restricted openings in these valves 200, 201 are particularly useful in preventing jamming of the control, should for some reason or other the valve 59 become stuck, i.e., fail to return to its neutral position.

Thus assuming that the valve element 59 becomes stuck in a position wherein the port 64 remains closed, the nose wheel is still permitted to caster in accordance with the reaction of the wheel with the ground since the port 64 is by-passed by the restricted opening in valve 200. Without such restricted opening in valve 200, the nose wheel could move only in one direction instead of two directions, as now provided. Similar castering is allowed should the valve element 59 become stuck in a position wherein the port 63 remains closed since in such case the port 63 is by-passed by the restricted opening in the valve 201.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a hydraulic control system of the character described comprising, a cylinder, a double acting piston in said cylinder, a control valve having a high pressure port, a first and a second port, a first and second fluid channel intercommunicating respectively said first and second ports with corresponding opposite sides of said piston, a check valve with a restricted opening therein in each one of said channels, said control valve having a third and a fourth port with a common channel interconnecting the same, said control valve having a three position movable valve element cooperating with each one of said ports, said valve element in a first position thereof closing said high pressure port and interconnecting on the one hand said second and fourth ports, a check valve with a restricted opening therein continuously communicating said first channel with said common channel, and a check valve with a restricted opening therethrough continuously interconnecting said second channel with said common channel.

2. A system as set forth in claim 1, in which a rechargeable accumulator is in communication with said common channel.

3. In an arrangement for orienting the positon of a steering wheel, a fluid pressure cylinder having a double acting piston therein with two opposite sides, said piston being interconnectable with said steering wheel to move said wheel in accordance with the position of said piston, a control valve incorporating a valve control element adapted to control the flow of fluid pressure to said piston, said valve being normally adapted to block the flow of high pressure fluid to said cylinder from a high pressure source, said valve normally being adapted to place said opposite sides of said double acting piston in communication with one another, a check valve having a continuously open restricted opening in each one of the two channels leading to said opposite sides of said double acting piston, a check valve with a continuously open restricted opening therein in communication with one of said two channels and bypassing said control valve.

4. In a hydraulic system for moving a controlled element, a fluid pressure cylinder having a double acting piston therein with two opposite sides, said piston being interconnectable with said element to move said element in accordance with the position of said piston, a control valve incorporating a valve control element adapted to control the flow of fluid pressure to said piston, said valve being normally adapted to block the flow of high pressure fluid to said cylinder from a high pressure source, said valve including a first and a second port which normally place said opposite sides of said piston in communication with one another, a first check valve having a restricted opening therethrough continuously bypassing one of said ports, and a second check valve having a restricted opening therethrough continuously bypassing the other one of said ports.

References Cited in the file of this patent

UNITED STATES PATENTS

| | | |
|---|---|---|
| 2,454,551 | Carlson | Nov. 23, 1948 |
| 2,628,827 | Hayman | Dec. 23, 1952 |
| 2,654,347 | Clark | Oct. 6, 1953 |
| 2,836,196 | Gunn | May 27, 1958 |